(12) United States Patent
Lee et al.

(10) Patent No.: US 10,104,461 B2
(45) Date of Patent: Oct. 16, 2018

(54) METHOD, ELECTRONIC APPARATUS AND WIRELESS EARPHONE OF CHOOSING MASTER WIRELESS EARPHONE IN WIRELESS EARPHONE SET

(71) Applicant: Merry Electronics(Shenzhen) Co., Ltd., Guangdong (CN)

(72) Inventors: Chun-Yuan Lee, New Taipei (TW); Hung-Yuan Li, New Taipei (TW)

(73) Assignee: Merry Electronics(Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 15/465,620

(22) Filed: Mar. 22, 2017

(65) Prior Publication Data

US 2017/0325016 A1    Nov. 9, 2017

(30) Foreign Application Priority Data

May 5, 2016   (TW) .............................. 105113916 A

(51) Int. Cl.
*H04R 5/033*   (2006.01)
*H04R 1/10*    (2006.01)
*H04R 5/02*    (2006.01)

(52) U.S. Cl.
CPC ....... *H04R 1/1041* (2013.01); *H04R 2420/07* (2013.01)

(58) Field of Classification Search
CPC ...... H04R 2420/07; H04R 5/033; H04R 3/12; H04R 5/04; H04R 1/10; H04R 2420/05; H04R 1/1041; H04S 7/308; H04M 1/6066; H04M 1/7253; H04M 2250/02

USPC ..... 381/309, 311, 58, 74, 77, 79, 80, 81, 85, 381/123; 455/41.2, 569.1, 575.2, 575.6
See application file for complete search history.

(56) References Cited

U.S. PATENT DOCUMENTS

| | | | |
|---|---|---|---|
| 9,002,044 B2 | 4/2015 | Dinescu et al. | |
| 2009/0185702 A1* | 7/2009 | Estrada ................ | H04B 7/0814 381/311 |
| 2013/0266152 A1* | 10/2013 | Haynie .................. | H04R 5/033 381/80 |

FOREIGN PATENT DOCUMENTS

| | | |
|---|---|---|
| CN | 104125522 | 10/2014 |
| TW | M509493 | 9/2015 |

* cited by examiner

*Primary Examiner* — Norman Yu
(74) *Attorney, Agent, or Firm* — JCIPRNET

(57) ABSTRACT

A method, an electronic apparatus and a wireless earphone of choosing a master wireless earphone in a wireless earphone set are provided. The method is adapted to the electronic apparatus pairing with the wireless earphone set. The method includes: transmitting first testing signals to a first wireless earphone in the wireless earphone set, and receiving first acknowledgment signals; transmitting second testing signals to a second wireless earphone in the wireless earphone set, and receiving second acknowledgment signals; determining whether a first ratio of the first acknowledgment signals to the first testing signals is higher than a second ratio of the second acknowledgment signals to the second testing signals; if yes, choosing the first wireless earphone as a master earphone, and setting the second wireless earphone as a slave wireless earphone; if no, choosing the second wireless earphone as the master earphone, and setting the first wireless earphone as the slave wireless earphone.

8 Claims, 4 Drawing Sheets

METHOD, ELECTRONIC APPARATUS AND WIRELESS EARPHONE OF CHOOSING MASTER WIRELESS EARPHONE IN WIRELESS EARPHONE SET

CROSS-REFERENCE TO RELATED APPLICATIONS

This application claims the priority benefit of Taiwan Patent Application No. 105113916, filed on May 5, 2016. The entirety of the above-mentioned patent application is incorporated herein by reference.

BACKGROUND

Field of the Invention

A method, an electronic apparatus and a wireless earphone of choosing a master wireless earphone in a wireless earphone set are provided.

Description of Related Art

A variety of wireless earphones, with the capability of saving time and efforts spent on arranging earphone cables for users, have become common devices for people to listen to media. Wireless earphone sets available in the market can be broadly classified into two types. One is a wireless earphone set equipped with a wire between two earphones, while the other is a wireless earphone set in which signals are transmitted by using wireless channels as transmission media between two earphones. When a user uses the latter type of wireless earphone set, an electronic apparatus (e.g., a smart phone) pairing with the wireless earphone set can measure parameters, such as receiver signal strength indicator (RSSI), channel state information (CSI) and round trip delay (RTD) and then accordingly, choose a master wireless earphone and a slave wireless earphone in the wireless earphone set. Generally, the master wireless earphone is, for example, the one in the wireless earphone set which has higher RSSI, better CSI and/or lower RTD.

Thereafter, when the electronic apparatus plays a medium (e.g., music), the electronic apparatus may first transmit an audio signal of the medium to the master wireless earphone (e.g., the left earphone), and the master wireless earphone then forwards the audio signal to the slave wireless earphone (e.g., the right earphone). In other words, the slave wireless earphone does not receive the audio signal directly from the electronic apparatus, but plays the audio signal forwarded by the master wireless earphone.

The electronic apparatus typically perform the operation of choosing the master wireless earphone only once. Therefore, if the connection quality between the master wireless earphone and the electronic apparatus is poor, the master wireless earphone may forward wrong signals to the slave wireless earphone. Besides, the parameters, such as RSSI, CSI and RTD, have great variability, and if choosing the master and the slave wireless earphones by using the parameters as indicators, the electronic apparatus will be affected by signal connection quality between itself and the two earphones. In other words, when the electronic apparatus receives wrong parameters such as RSSI, CSI or RTD due to the poor quality of the connection with the two earphones, the electronic apparatus may mistakenly choose the wireless earphone with the poor signal quality as the master wireless earphone.

Therefore, no matter which of the aforementioned situation occurs, the user's experience of the wireless earphone set may be reduced. Accordingly, how to develop a preferable method of choosing the master wireless earphone is a goal that persons skilled in the art have to achieve.

SUMMARY

Accordingly, the invention provides a method, an electronic apparatus and a wireless earphone of choosing a master wireless earphone in a wireless earphone set are provided. In the method, a plurality of testing signals are transmitted to two wireless earphones in a wireless earphone set by an electronic apparatus paring with the wireless earphone set, thereby, testing which one of the two wireless earphones can successfully receive more testing signals. In this way, the electronic apparatus can choose the wireless earphone with better connection quality as a master wireless earphone, so as to avoid the issue in the related art.

According to an embodiment, the invention is directed to a method of choosing a master wireless earphone in a wireless earphone set, which is adapted to an electronic apparatus pairing with the wireless earphone set. The method includes: transmitting a plurality of first testing signals to a first wireless earphone in the wireless earphone set, and receiving a plurality of first acknowledgment signals, wherein the first acknowledgment signals are returned to the electronic apparatus by the first wireless earphone due to correctly receiving a first part of the first testing signals; transmitting a plurality of second testing signals to a second wireless earphone in the wireless earphone set, and receiving a plurality of second acknowledgment signals, wherein the second acknowledgment signals are returned to the electronic apparatus by the second wireless earphone due to correctly receiving a second part of the second testing signals; determining whether a first acknowledgment ratio of the first acknowledgment signals to the first testing signals is higher than a second acknowledgment ratio of the second acknowledgment signals to the second testing signals; if yes, choosing the first wireless earphone as a master earphone of the wireless earphone set, and setting the second wireless earphone as a slave earphone of the wireless earphone set; and if no, choosing the second wireless earphone as the master earphone of the wireless earphone set, and setting the first wireless earphone as the slave earphone of the wireless earphone set.

In an embodiment of the invention, before the step of transmitting the first testing signals and the second testing signals, the method further includes providing a first instruction message to guide a user to place the electronic apparatus and the wireless earphone set in a plurality of specified positions.

In an embodiment of the invention, the method further includes providing a second instruction message to inform the user that the operation of choosing the master wireless earphone in the wireless earphone set is completed.

In an embodiment of the invention, the method further includes determining whether the electronic apparatus ends playback of an audio file or a video file; if yes, re-transmitting the first testing signals and the second testing signals, so as to rechoose the master wireless earphone in the wireless earphone set; and if no, re-transmitting the first testing signals and the second testing signals after the electronic apparatus ends the playback of the audio file or the video file, so as to rechoose the master wireless earphone in the wireless earphone set.

In an embodiment of the invention, the method further includes re-transmitting the first testing signals and the second testing signals after the electronic apparatus goes through a startup procedure, so as to rechoose the master wireless earphone in the wireless earphone set.

According to an embodiment, the invention is directed to an electronic apparatus of choosing a master wireless earphone in a wireless earphone set. The electronic apparatus includes a transceiver, a storage circuit and a processing circuit. The storage circuit stores a plurality of modules. The processing circuit is coupled with the transceiver and the storage circuit, accesses and executes the modules. The modules referred herein include a first testing module, a second testing module, a determining module and a choosing module. The first testing module transmits a plurality of first testing signals to a first wireless earphone in the wireless earphone set and receives a plurality of first acknowledgment signals. The first acknowledgment signals are returned to the electronic apparatus by the first wireless earphone due to correctly receiving a first part of the first testing signals. The second testing module transmits a plurality of second testing signals to a second wireless earphone in the wireless earphone set and receives a plurality of second acknowledgment signals. The second acknowledgment signals are returned to the electronic apparatus by the second wireless earphone due to correctly receiving a second part of the second testing signals. The determining module determines whether a first acknowledgment ratio of the first acknowledgment signals to the first testing signals is higher than a second acknowledgment ratio of the second acknowledgment signals to the second testing signals. The choosing module chooses the first wireless earphone as a master earphone of the wireless earphone set and sets the second wireless earphone as a slave earphone of the wireless earphone set if the first acknowledgment ratio is higher than the second acknowledgment ratio. Otherwise, the choosing module chooses the second wireless earphone as the master earphone of the wireless earphone set and sets the first wireless earphone as the slave earphone of the wireless earphone set.

In an embodiment of the invention, the electronic apparatus further includes a guiding module configured to provide a first instruction message to guide a user to place the electronic apparatus and the wireless earphone set in a plurality of specified positions.

In an embodiment of the invention, the guiding module further provides a second instruction message to inform the user that the operation of choosing the master wireless earphone in the wireless earphone set is completed.

In an embodiment of the invention, the electronic apparatus further includes an updating module configured to determine whether the electronic apparatus ends playback of an audio file or a video file; if yes, re-transmit the first testing signals and the second testing signals via the first testing module and the second testing module, so as to rechoose the master wireless earphone in the wireless earphone set; and if no, re-transmit the first testing signals and the second testing signals via the first testing module and the second testing module after the electronic apparatus ends the playback of the audio file or the video file if no, so as to rechoose the master wireless earphone in the wireless earphone set.

In an embodiment of the invention, the electronic apparatus further includes an updating module configured to re-transmit the first testing signals and the second testing signals via the first testing module and the second testing module after the electronic apparatus goes through a startup procedure, so as to rechoose the master wireless earphone in the wireless earphone set.

According to an embodiment, the invention is directed to a wireless earphone belonging to a wireless earphone set with another wireless phone. The wireless earphone includes a transceiver, a storage circuit and a processing circuit. The storage circuit stores a plurality of modules. The processing circuit is coupled with the transceiver and the storage circuit, accesses and executes the modules. The modules referred herein include a receiving module, an acknowledging module and a transmitting module. The receiving module receives a plurality of testing signals from an electronic apparatus paring with the wireless earphone set. The acknowledging module finds out a part of the testing signals matching a preset signal and correspondingly generates a plurality of acknowledgment signals. The transmitting module returns the acknowledgment signals to the electronic apparatus, such that the electronic apparatus chooses a master wireless earphone in the wireless earphone set.

In an embodiment of the invention, when the wireless earphone is chosen as the master wireless earphone in the wireless earphone set by the electronic apparatus, the transmitting module is further configured to forward an audio signal of an audio file or a video file played by the electronic apparatus to the other wireless earphone in the wireless earphone set.

To sum up, the electronic apparatus provided by the embodiments of the invention can transmit a plurality of testing signals respectively to two wireless earphones in the wireless earphone set and receives the acknowledgment signals respectively returned in response to the testing signals by the two wireless earphones. Thereby, which one of the two wireless earphones has the better connection quality can be tested. In this way, the electronic apparatus can choose the wireless earphone with better connection quality as the master wireless earphone, and the master wireless earphone can forward the more correct signals to the slave wireless earphone to improve listening quality for the user.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
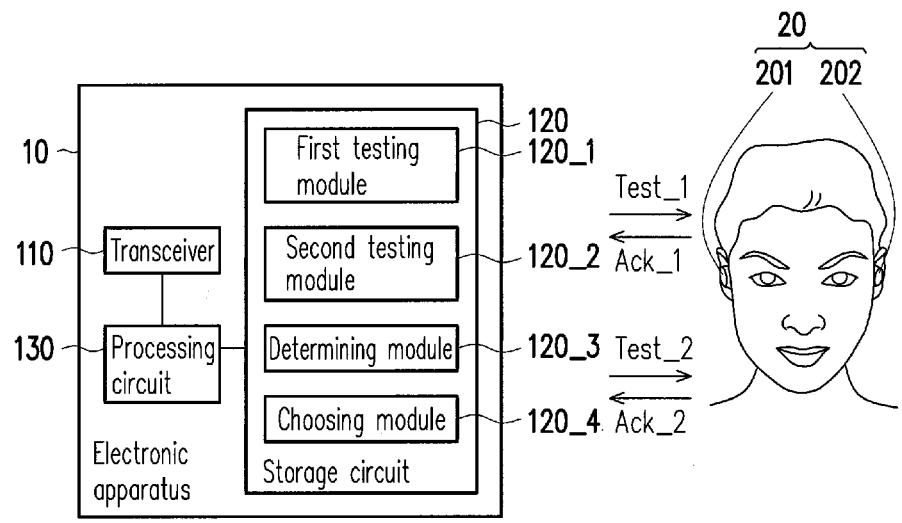
FIG. 1 is a schematic diagram illustrating an electronic apparatus and a wireless earphone set according to an embodiment of the invention.

FIG. 1 is a schematic diagram illustrating an electronic apparatus 10 and a wireless earphone set 20 according to an embodiment of the invention. In the present embodiment, the electronic apparatus 10 includes a transceiver 110, a storage circuit 120 and a processing circuit 130. The electronic apparatus 10 is, for example, a smart phone, a tablet PC, a personal digital assistant (PDA), a notebook PC or the like. The transceiver 110 includes, for example, but not limited to, components such as a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antenna units and a local storage medium for providing the electronic apparatus with wireless accessing.

The transceiver 110 may include functional units to perform operations such as low noise amplifying, impedance matching, frequency mixing, down frequency conversion, filtering, amplifying, and so forth.

In an embodiment, the transceiver 110 communicates with the wireless earphone set 20 according to the Bluetooth protocol or any other similar protocol, but the invention is not limited thereto. The storage circuit 120 is, for example, a memory, a hard disk or any other device used for storing data and capable of recording a plurality of modules.

The processing circuit 130 is coupled with the transceiver 110 and the storage circuit 120. The processing circuit 130 is a general purpose processor, a special purpose processor, a typical processor, a digital signal processor (DSP), a plurality of microprocessors, one or more microprocessors integrated with a DSP core, a controller, a micro-controller, an application specific integrated circuit (ASIC), a field programmable gate array (FPGA), any other type of integrated circuit, a state machine, an advanced RISC machine-based processor or the like.

In the present embodiment, the wireless earphone set 20 pairing with the electronic apparatus 10 includes a first wireless earphone 201 and a second wireless earphone 202. The first wireless earphone 201 and the second wireless earphone 202 are, for example, a left earphone and a right ear phone for a user to listen to an audio file with two ears, which are not limited in the invention.

Figure 2:
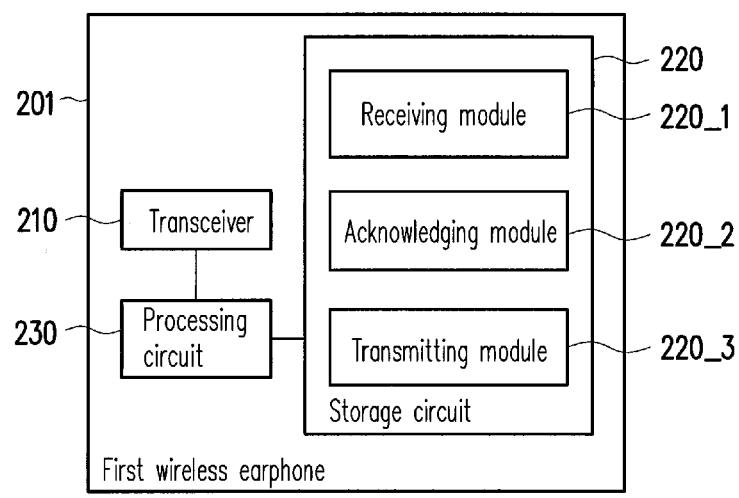
FIG. 2 is a functional block diagram illustrating the first wireless earphone according to an embodiment of the present invention.

FIG. 2 is a functional block diagram illustrating the first wireless earphone 201 according to an embodiment of the present invention. In the present embodiment, the first wireless earphone 201 includes a transceiver 210, a storage circuit 220 and a processing circuit 230. In the present embodiment, the possible implementation manners of the transceiver 210, the storage circuit 220 and the processing circuit 230 are similar to those of the transceiver 110, the storage circuit 120 and the processing circuit 130 of the electronic apparatus 10 and thus, will not be repeatedly described. Besides, the implementation manner of the second wireless earphone 202 is substantially the same as the first wireless earphone 201 and will also not be repeatedly described.

Referring to FIG. 1 again, in the present embodiment, the processing circuit 130 of the electronic apparatus 10 accesses a first testing module 120_1, a second testing module 120_2, a determining module 120_3 and a choosing module 120_4 stored by the storage circuit 120 for performing each step of a method of choosing a master wireless earphone in the wireless earphone set 20 provided by the invention.

Figure 3:
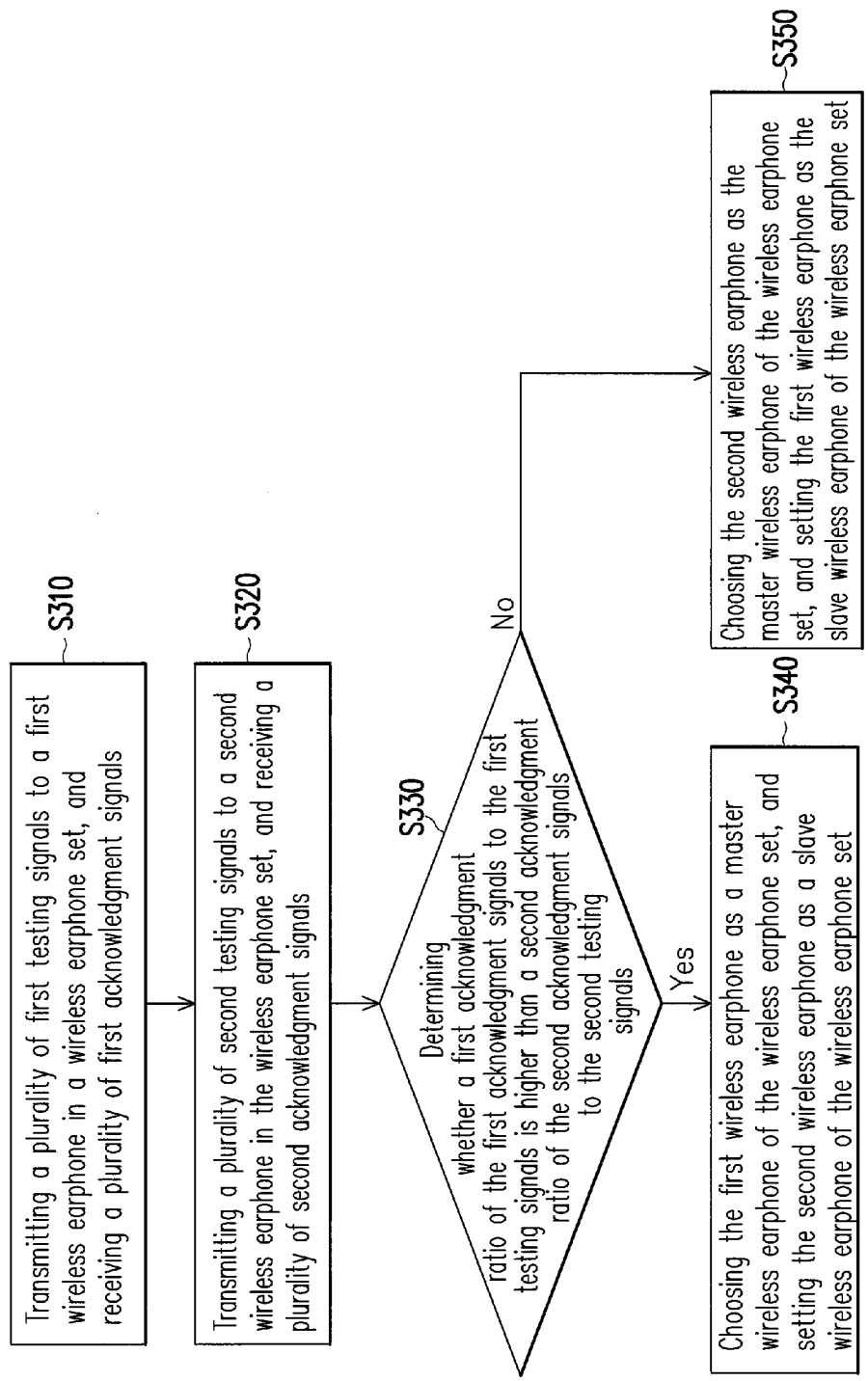
FIG. 3 is a flowchart illustrating a method for the electronic apparatus choosing a master wireless earphone in the wireless earphone set according to an embodiment of the invention.

FIG. 3 is a flowchart illustrating a method for the electronic apparatus 10 choosing a master wireless earphone in the wireless earphone set 20 according to an embodiment of the invention. The method provided in the present embodiment may be performed by the electronic apparatus 10 illustrated in FIG. 1 to choose a master wireless earphone in the wireless earphone set 20. Detailed steps of the method of the present embodiment will be described with reference to each element of the electronic apparatus 10 illustrated in FIG. 1.

In step S310, the first testing module 120_1 transmits a plurality of first testing signals Test_1 to the first wireless earphone 201 in the wireless earphone set 20 and receives a plurality of first acknowledgment signals Ack_1 through the transceiver 110. The first acknowledgment signals Acl_1 are, for example, returned to the electronic apparatus 10 by the first wireless earphone 201 due to correctly receiving a first part of the first testing signals Test_1.

In an embodiment, the first wireless earphone 201 returns a first acknowledgment signal Ack_1 to the electronic apparatus 10 each time right after correctly/successfully receiving one testing signal Test_1. In other embodiments, the first wireless earphone 201 may, after all the first testing signals Test_1 are received, calculate the number of the testing signals Test_1 correctly/successfully received thereby and return the same number of first acknowledgment signals Ack_1 to the electronic apparatus 10, but the invention is not limited thereto.

In an embodiment, the electronic apparatus 10 may communicate with the wireless earphone set 20 according to the Bluetooth protocol. Thus, the plurality of first testing signals Test_1 transmitted by the first testing module 120_1 through the transceiver 110 may be designed, for example, in a packet format in compliance with the Bluetooth protocol.

Figure 4:
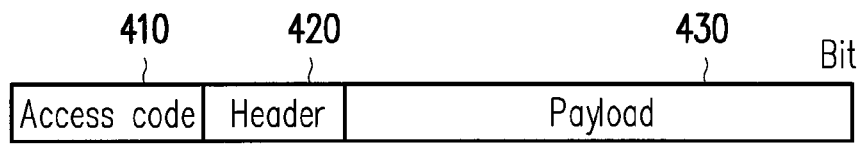
FIG. 4 illustrates a Bluetooth (BT) packet format according to an embodiment of the invention.

FIG. 4 illustrates a Bluetooth (BT) packet format 400 according to an embodiment of the invention. In the present embodiment, the packet format 400 in compliance with the Bluetooth protocol includes fields at least containing an access code 410, a header 420 and a payload 430. The fields of access code 410 and the header 420 are fixed, and the field of payload 430 has 0 to 2745 bits. The first testing module 120_1 may place an identification code contained in each first testing signal Test_1 in the field of payload 430 to test whether the first wireless earphone 201 in the wireless earphone set 20 can correctly receive the first testing signals Test_1.

For example, it is assumed that the identification code set in the field of payload 430 by the first testing module 120_1 is "11111000001111100000" (i.e., five "1" followed by five "0" and so repeated for 2745 bits in total). When the first testing module 120_1 transmits a first testing signal Test_1 containing the identification code to the first wireless earphone 201 in the wireless earphone set 20, the first wireless earphone 201 has to find out the part contained in the first testing signal Test_1 which matches its preset signal, i.e., the part of the identification code in the packet format 400. When the preset signal is identical to the identification code, the first wireless earphone 201 can therefore determine that one first testing signal Test_1 is correctly received, so as to return a first acknowledgment signal Ack_1 to the electronic apparatus 10. It should be mentioned that the preset signal of the first wireless earphone 201 includes, for example, built-in information or information received in advanced from the electronic apparatus 10, which is not limited in the invention.

In an embodiment, after transmitting a first testing signal Test_1, the electronic apparatus 10 has to receive a first acknowledgment signal Ack_1 correspondingly returned by the first wireless earphone 201 within a preset time period. In other words, as long as the electronic apparatus 10 does not receive the corresponding first acknowledgment signal Ack_1 within the preset time period, the electronic apparatus 10 determines that the signal transmitted this time is poor.

In this way, the first testing module 120_1 may transmit a plurality of first testing signals Test_1 to the first wireless earphone 201 in the wireless earphone set 20 through the transceiver 110 and receive a plurality of first acknowledgment signals Ack_1 returned by the first wireless earphone 201 due to correctly receiving a first part of the first testing signals Test_1.

In step S320, the second testing module 120_2 transmits a plurality of second testing signals Test_2 to the second wireless earphone 202 in the wireless earphone set 20 and receives a plurality of second acknowledgment signals Ack_2. The second acknowledgment signals Ack_2 are returned to the electronic apparatus 10 by the second wireless earphone 202 due to correctly receiving a second part of the second testing signals Test_2.

In the present embodiment, since the electronic apparatus 10 is to test which one of the first wireless earphone 201 and the second wireless earphone 202 in the wireless earphone set 20 has better connection quality, the second testing module 120_2 also transmits a plurality of second testing signals Test_2 similar to the first testing signals Test_1 to the second wireless earphone 202 in the wireless earphone set 20 and receives a plurality of second acknowledgment signals Ack_2 returned by the second wireless earphone 202 due to correctly receiving the second part of the second testing signals Test_2. Details related to step S320 may refer to the description related to step S310 and will not be repeated.

In step S330, the determining module 120_3 determines whether a first acknowledgment ratio of the first acknowledgment signals Ack_1 to the first testing signals Test_1 is higher than a second acknowledgment ratio of the second acknowledgment signals Ack_2 to the second testing signals Test_2.

In the present embodiment, the determining module 120_3 calculates the first acknowledgment ratio of the number of the received first acknowledgment signals Ack_1 (which is a, for example) to the number of the transmitted first testing signals Test_1 (which is b, for example), which is a/b, for example. Meanwhile, the determining module 120_3 also calculates the second acknowledgment ratio of the number of the received second acknowledgment signals Ack_2 (which is c, for example) to the number of the transmitted second testing signals Test_2 (which is b, for example), which is c/d, for example. Then, the determining module 120_3 determines whether the first acknowledgment ratio is higher than the second acknowledgment ratio.

If the first acknowledgment ratio is higher than the second acknowledgment ratio, it represents that the first wireless earphone 201 correctly/successfully receives a higher ratio of the first testing signals Test_1. Namely, connection quality between the first wireless earphone 201 and the electronic apparatus 10 is better. Thus, in step S340, the choosing module 120_4 chooses the first wireless earphone 201 as a master wireless earphone in the wireless earphone set 20 and sets the second wireless earphone 202 as a slave wireless earphone of the wireless earphone set 20. Thereby, the electronic apparatus 10 can forward a signal to the slave wireless earphone in the wireless earphone set 20 through the master wireless earphone, so as to transmit a more correct signal to the slave wireless earphone in a condition that the master wireless earphone has better connection quality.

On the other hand, if the first acknowledgment ratio is not higher than the second acknowledgment ratio, it represents that the second wireless earphone 202 correctly/successfully a higher ratio of the second testing signals Test_2. Namely, the connection quality between the second wireless earphone 202 and the electronic apparatus 10 is better. Thus, in step S350, the choosing module 120_4 chooses the second wireless earphone 202 as the master wireless earphone in the wireless earphone set 20 and sets the first wireless earphone 201 as the salve wireless earphone of the wireless earphone set 20.

Figure 5:
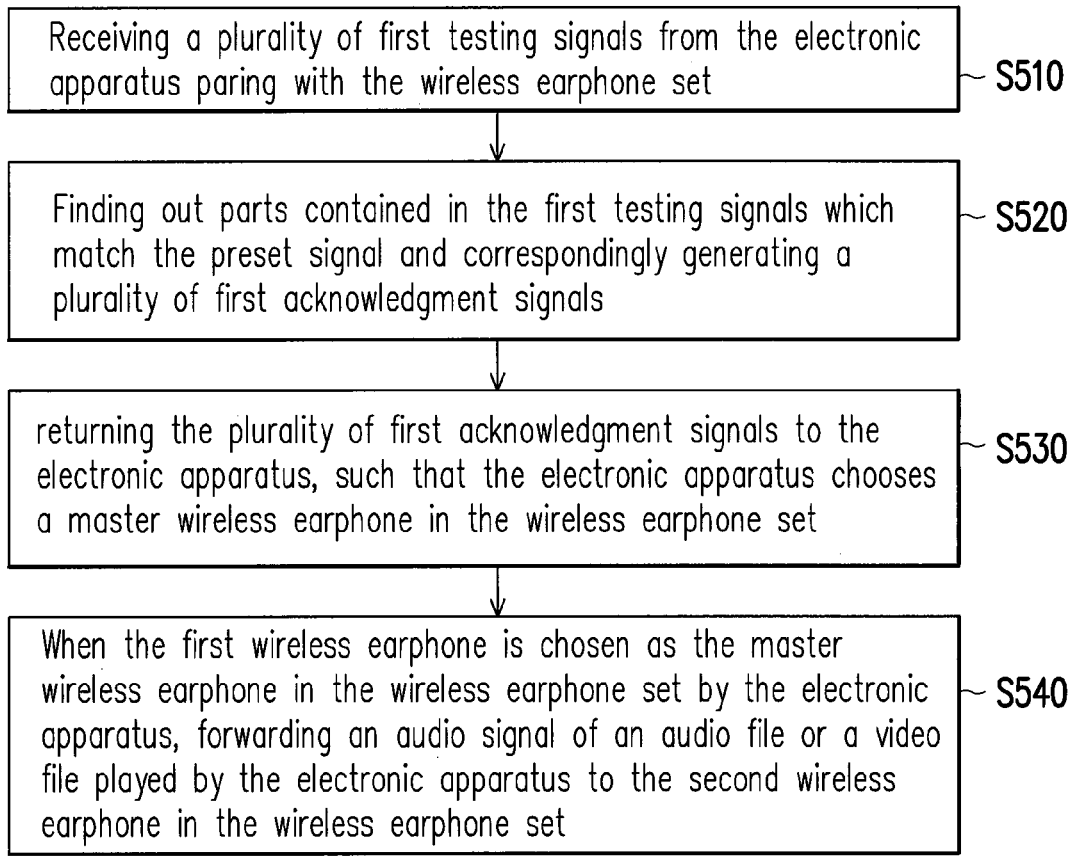
FIG. 5 is a flowchart illustrating a method of choosing the master wireless earphone in the wireless earphone set from the aspect of the first wireless earphone according to the above embodiments of the invention.

FIG. 5 is a flowchart illustrating a method of choosing the master wireless earphone in the wireless earphone set 20 from the aspect of the first wireless earphone 201 according to the above embodiments of the invention. In the present embodiment, the processing circuit 230 of the first wireless earphone 201 accesses the receiving module 220_1, the acknowledging module 220_2 and the transmitting module 220_3 (illustrated in FIG. 2) stored by the storage circuit 220 for performing each step of the method of choosing a master wireless earphone in the wireless earphone set 20 provided by the invention. The method provided in the present embodiment may be performed by the first wireless earphone 201 illustrated in FIG. 1. Detailed steps of the method of the present embodiment will be described with reference to each element of the first wireless earphone 201 illustrated in FIG. 2.

In step S510, the receiving module 220_1 receives a plurality of first testing signals Test_1 from the electronic apparatus 10 paring with the wireless earphone set 20. In step S520, the acknowledging module 220_2 finds out parts contained in the first testing signals Test_1 which match the preset signal and correspondingly generates a plurality of first acknowledgment signals Ack_1. In step S530, the transmitting module 220_3 returns the plurality of first acknowledgment signals Ack_1 to the electronic apparatus 10, such that the electronic apparatus 10 chooses a master wireless earphone in the wireless earphone set 20. In step S540, when the first wireless earphone 201 is chosen as the master wireless earphone in the wireless earphone set 20 by the electronic apparatus 10, the transmitting module 220_3 is further configured to forward an audio signal of an audio file or a video file played by the electronic apparatus 10 to the second wireless earphone 202 in the wireless earphone set. Since FIG. 5 is the flowchart illustrating the method of choosing the master wireless earphone in the wireless earphone set 20 in the aspect of the first wireless earphone 201, implementation details related to steps S510 to S530 may refer to the description related to FIG. 3 and will not be repeated.

In brief, in the method of choosing the master wireless earphone in a wireless earphone set of the invention, the electronic apparatus pairing with the wireless earphone set may respectively transmit a plurality of first and second testing signals to the first and the second wireless earphones in the wireless earphone set, and the first and the second wireless earphones respectively return the plurality of first and second testing signals to the electronic apparatus due to correctly receiving the first and the second testing signals.

Thereby, the electronic apparatus respectively calculate signal reception ratios of the first and the second wireless earphones, so as to choose the wireless earphone with better connection quality as the master wireless earphone. In this way, the master wireless earphone may forward the signal with better quality to the other wireless earphone in the wireless earphone set, so as to improve listening quality for the user.

On the other hand, in order to avoid the user when using the wireless earphone set 20 from placing the electronic apparatus 10 in a position which easily leads to poor connection quality between the electronic apparatus 10 and the wireless earphone set 20, the electronic apparatus 10 of the invention may also adaptively guide the user to place the electronic apparatus 10 in a proper position, so as to choose the master wireless earphone in a condition in consistency with the actual use scenario.

Figure 6:
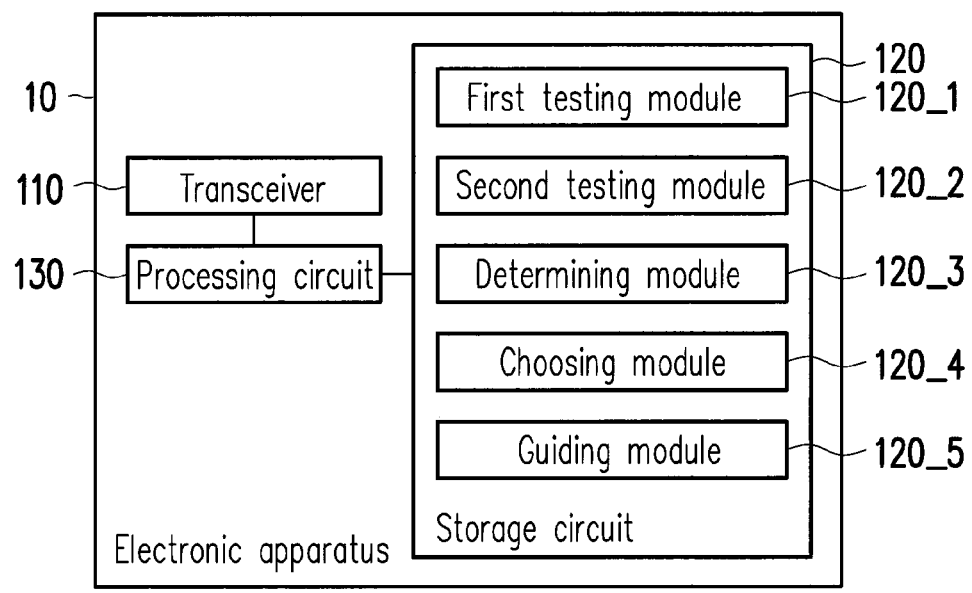
FIG. 6 is a block diagram illustrating the electronic apparatus according to another embodiment of the invention.

FIG. 6 is a block diagram illustrating the electronic apparatus 10 according to another embodiment of the invention. In the present embodiment, the storage circuit 120 of the electronic apparatus 10 further includes a guiding module 120_5. The guiding module 120_5 provides a first instruction message through a display interface of the electronic apparatus 10 or plays the first instruction message audibly through a speaker of the electronic apparatus 10. In an embodiment, the first instruction message may be used to guide the user to place the wireless earphone set 20 in a specified position, e.g., on the user's ears. In addition, the first instruction message may also be used to guide the user to put the electronic apparatus 10 in a jacket pocket, a front pants pocket, a handbag or any other position where the user is used to place the electronic apparatus 10.

Thereafter, the electronic apparatus 10 may perform the method provided by the embodiments above to choose the master wireless earphone in the wireless earphone set 20. In this way, the electronic apparatus 10 can choose the suitable master wireless earphone in a condition in consistency with the user's usage habit.

Then, when the user places each of the electronic apparatus 10 and the wireless earphone set 20 in one of the aforementioned specified positions in accordance with the first instruction message, in order to avoid keeping the user waiting without knowing whether the operation of the electronic apparatus 10 choosing the master wireless earphone is completed, the guiding module 120_5 may further provide a second instruction message (e.g., an audio message, a specific voice, a vibration or a visible light prompt) to inform the user that the operation of choosing the master wireless earphone in the wireless earphone set 20 is completed.

In other embodiments of the invention, the wireless communication environment between the electronic apparatus 10 and the wireless earphone set 20 varies with time, and therefore, in order to prevent the master wireless earphone in the wireless earphone set 20 from forwarding wrong signals to the wireless earphone serving as the slave wireless earphone due to poor connection quality, the electronic apparatus can rechoose the wireless earphone serving as the master wireless earphone in certain conditions.

Figure 7:
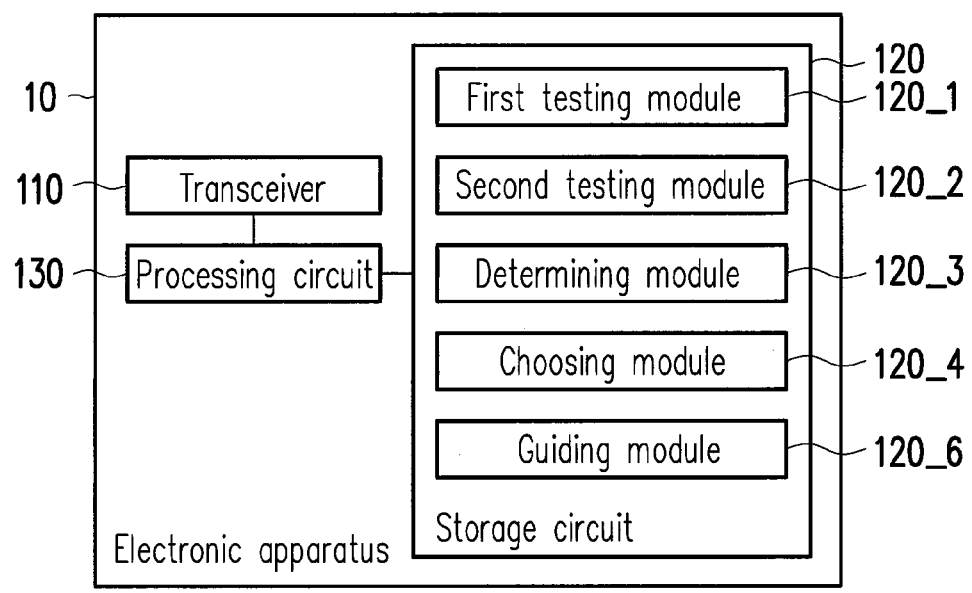
FIG. 7 is a block diagram illustrating the electronic apparatus according to yet another embodiment of the invention.

FIG. 7 is a block diagram illustrating the electronic apparatus 10 according to another embodiment of the invention. Referring to FIG. 7, the storage circuit 120 of the electronic apparatus 10 further includes an updating module 120_6. In the present embodiment, the updating module 120_6 determines whether the electronic apparatus 10 ends playback of an audio file or a video file. If yes, the updating module 120_6 re-transmits a plurality of first testing signals Ack_1 and a plurality of second testing signals Ack_2 via the first testing module 120_1 and the second testing module 120_2, so as to choose the master wireless earphone in the wireless earphone set 20. If no, after whether the electronic apparatus 10 ends the playback of the audio file or the video file, the updating module 120_6 re-transmits a plurality of first testing signals Ack_1 and a plurality of second testing signals Ack_2 via the first testing module 120_1 and the second testing module 120_2, so as to choose the master wireless earphone in the wireless earphone set 20. In brief, the updating module 120_6 can perform the aforementioned operation to rechoose the master wireless earphone after the electronic apparatus 10 completes the playback of a song and/or a video.

In another present embodiment, the updating module 120_6 may re-transmit a plurality of first testing signals Ack_1 and a plurality of second testing signals Ack_2 via the first testing module 120_1 and the second testing module 120_2 after the electronic apparatus 10 goes through a startup procedure, so as to choose the master wireless earphone in the wireless earphone set 20.

Based on the above, the method provided by the invention can facilitate the electronic apparatus in respectively transmitting the testing signals to the first and the second wireless earphones and then determining which one of the first and the second wireless earphones is more suitable as the master wireless earphone according to the acknowledgment signals returned by the first and the second wireless earphones. In this way, the electronic apparatus can choose the wireless earphone with better connection quality as the master wireless earphone, so as to forward the more correct signal through the master wireless earphone to the other wireless earphone in the wireless earphone set. Besides, the invention can allow adaptively rechoosing the master wireless earphone at once in certain conditions, so as to maintain signal transmission quality for the wireless earphone set.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method of choosing a master wireless earphone in a wireless earphone set, adapted to an electronic apparatus pairing with the wireless earphone set, comprising:

transmitting a plurality of first testing signals to a first wireless earphone in the wireless earphone set, and receiving a plurality of first acknowledgment signals, wherein the first acknowledgment signals are returned to the electronic apparatus by the first wireless earphone due to correctly receiving a first part of the first testing signals;

transmitting a plurality of second testing signals to a second wireless earphone in the wireless earphone set, and receiving a plurality of second acknowledgment signals, wherein the second acknowledgment signals are returned to the electronic apparatus by the second wireless earphone due to correctly receiving a second part of the second testing signals;

determining whether a first acknowledgment ratio of the first acknowledgment signals to the first testing signals is higher than a second acknowledgment ratio of the second acknowledgment signals to the second testing signals; and if yes, choosing the first wireless earphone as a master earphone of the wireless earphone set, and setting the second wireless earphone as a slave wireless earphone of the wireless earphone set; and if no, choosing the second wireless earphone as the master earphone of the wireless earphone set, and setting the first wireless earphone as the slave earphone of the wireless earphone set.

2. The method according to claim 1, wherein before the step of transmitting the first testing signals and the second testing signals, the method further comprises:

providing a first instruction message to guide a user to place the electronic apparatus and the wireless earphone set in a plurality of specified positions.

3. The method according to claim 1, further comprising: further comprising:

determining whether the electronic apparatus ends playback of an audio file or a video file; and if yes, re-transmitting the first testing signals and the second testing signals, so as to rechoose the master wireless earphone in the wireless earphone set; and if no, re-transmitting the first testing signals and the second testing signals after the electronic apparatus ends the playback of the audio file or the video file, so as to rechoose the master wireless earphone in the wireless earphone set.

4. The method according to claim 1, further comprising:

re-transmitting the first testing signals and the second testing signals after the electronic apparatus goes through a startup procedure, so as to rechoose the master wireless earphone in the wireless earphone set.

5. An electronic apparatus of choosing a master wireless earphone in a wireless earphone set, comprising:

a transceiver;

a storage circuit, storing a plurality of modules; and a processing circuit, coupled with the transceiver and the storage circuit, configured to:

transmit a plurality of first testing signals to a first wireless earphone in the wireless earphone set and receiving a plurality of first acknowledgment signals, wherein the first acknowledgment signals are returned to the electronic apparatus by the first wireless earphone due to correctly receiving a first part of the first testing signals;

transmit a plurality of second testing signals to a second wireless earphone in the wireless earphone set and receiving a plurality of second acknowledgment signals, wherein the second acknowledgment signals are returned to the electronic apparatus by the second wireless earphone due to correctly receiving a second part of the second testing signals;

determine whether a first acknowledgment ratio of the first acknowledgment signals to the first testing signals is higher than a second acknowledgment ratio of the second acknowledgment signals to the second testing signals; and choose the first wireless earphone as a master earphone of the wireless earphone set and setting the second wireless earphone as the slave earphone of the wireless earphone set if the first acknowledgment ratio is higher than the second acknowledgment ratio, or else, choosing the second wireless earphone as the master earphone of the wireless earphone set and setting the first wireless earphone as the slave earphone of the wireless earphone set.

6. The electronic apparatus according to claim 5, wherein the processing circuit is further configured to: provide a first instruction message to guide a user to place the electronic apparatus and the wireless earphone set in a plurality of specified positions, wherein the processing circuit further provides a second instruction message to inform the user that the operation of choosing the master wireless earphone in the wireless earphone set is completed.

7. The electronic apparatus according to claim 5, wherein the processing circuit is further configured to:

determine whether the electronic apparatus ends playback of an audio file or a video file; and if yes, re-transmit the first testing signals and the second testing signals, so as to rechoose the master wireless earphone in the wireless earphone set; and if no, re-transmit the first testing signals and the second testing signals after the electronic apparatus ends the playback of the audio file or the video file, so as to rechoose the master wireless earphone in the wireless earphone set.

8. The electronic apparatus according to claim 5, wherein the processing circuit is further configured to:

re-transmit the first testing signals and the second testing signals after the electronic apparatus goes through a startup procedure, so as to rechoose the master wireless earphone in the wireless earphone set.

* * * * *